D. RICHARDSON.
Horse-Powers.
No. 134,167. Patented Dec. 24, 1872.
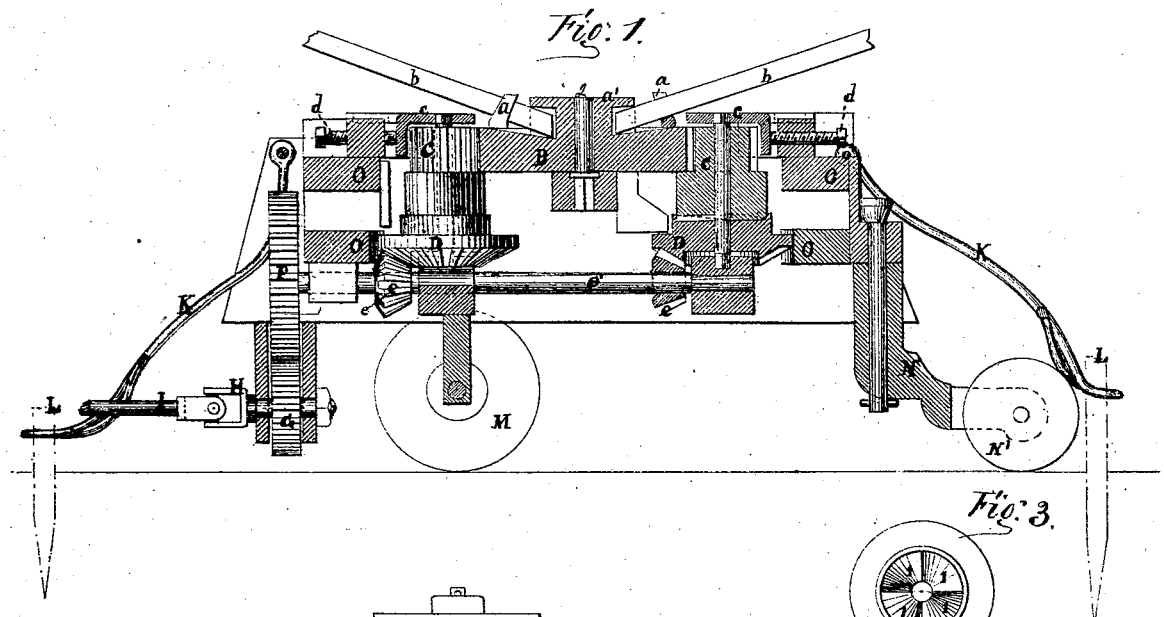
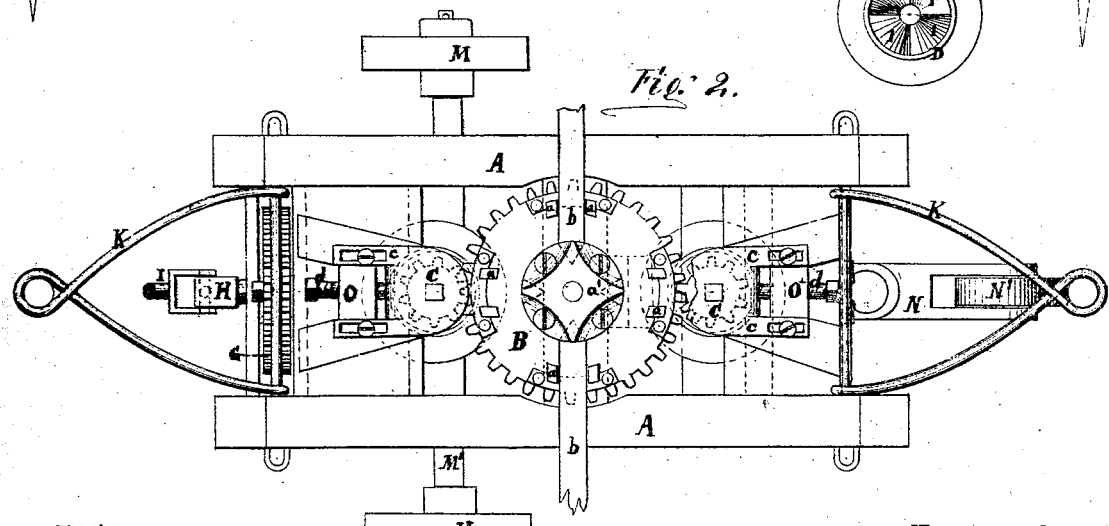
Witnesses:
J. H. Yeatman
C. C. Meadon
Inventor:
David Richardson,
by his attys
Clayton & Co.

UNITED STATES PATENT OFFICE.

DAVID RICHARDSON, OF ONOWA, IOWA.

IMPROVEMENT IN HORSE-POWERS.

Specification forming part of Letters Patent No. 134,167, dated December 24, 1872; antedated December 21, 1872.

*To all whom it may concern:*

Be it known that I, DAVID RICHARDSON, of Onowa, in the county of Monona and in the State of Iowa, have invented a certain new and useful Portable Horse-Power for Thrashing-Machines, &c.; and do hereby declare that the following is a full, clear, and exact description thereof, reference being had to the accompanying drawing and the letters of reference marked thereon, in which—

Figure 1 is a side elevation with the side of the frame A, as seen in Fig. 2, removed; Fig. 2 is a plan view; and Fig. 3 is a plan view of the clutches on faces of wheels C C and D D on a vertical shaft, on which they revolve.

The nature of my invention consists in the construction of the gearing in combination with the frame and truck as a movable horse-power, as hereinafter set forth.

To enable others skilled in the art to make and use my invention, I will proceed to describe its construction and operation.

In Fig. 1—B, the power or driving-wheel, which revolves loosely on a stationary shaft, 2, which shaft is set into a square mortise in one of the cross-ties of the frame. On the top face of this wheel is placed a projection with apertures to receive the bars $b\ b$ or levers, which bars $b\ b$ rest in forked cleats $a\ a$ on the face of plate B. The power is applied to bars $b\ b$ or levers. C C are gear-wheels, into which the wheel B gears. The wheels C C have on their lower faces clutches 1, which fit in corresponding clutches 1 in the top of wheels D D, and on the bottom face of wheels D D are cogs that gear into bevel cog-wheels $e\ e$ on the shaft $e'$. The wheels C C and D D revolve on shafts which have their bearings in cross-ties of frame A and plates $c\ c$. These plates are secured to the frame $o$, and can be adjusted by the screws $d\ d$, when required so to do. On the shaft $e'$ is cog-wheel F, which gears into gear-wheel G. To said shaft is attached a link, H, to readily attach the power to the machine to be driven. I, the link attachment, attached to the machine to be operated; K K, the braces used in fastening the power when in use by stakes L L, and are attached to frame A A, and to aid in moving the same at will; M M, the wheels on which the machine rests mostly; N', the steering-wheel.

In Fig. 2—A A A A, the frame. The same letters designate the like parts as in Fig. 1.

In Fig. 3 are shown the clutches on the lower face of wheels C C, and which catch into corresponding clutches on the top faces of wheels D D.

In the operation of my invention, having been constructed as set forth, and the machine made stationary, as set forth, power is applied to the bars $b\ b$, which give motion to wheel B; this, gearing into wheels C C, and by the clutches 1 on the lower faces of these wheels and upper faces of the wheels D D, motion is given to wheels D D, which give motion to the bevel-wheels $e\ e$ on shaft $e'$, and this shaft, revolving, gives motion to the wheel F, which is on said shaft, and this wheel gives motion to wheel G, to which is attached the link or other attachment to fasten the power to the machine to be operated by it.

The machine can be readily removed to any required place, and there firmly secured until the required work is done.

I am thus enabled to construct a cheap and efficient movable horse-power, readily moved and fixed for operation.

By means of the clutches on the faces of the wheels C C and D D power ceases to be communicated to the wheels D D and $e\ e$ on shaft $e'$ when the power is reversed.

Having thus described my invention, what I claim as new, and desire to secure by Letters Patent, is—

1. The wheels C C and D D with clutches on the faces of said wheels, in combination with driving-wheel B, bevel-wheels $e\ e$, and wheels F and G, substantially as described, and operating as set forth.

2. The combination of the cog-wheels B, C C, D D, $e\ e$, F, and G with the frame A and truck M M and N and N', substantially as described, and operating as set forth.

In testimony that I claim the above-described certain new and useful portable horse-power for thrashing-machines, &c., I have hereunto signed my name this 6th day of April, 1870.

DAVID RICHARDSON.

Witnesses:
EDWIN JAMES MYERS,
ANDREW JACKSON RICHARDSON.